United States Patent
Oshima

(10) Patent No.: US 7,392,343 B2
(45) Date of Patent: Jun. 24, 2008

(54) MEMORY CARD HAVING A STORAGE CELL AND METHOD OF CONTROLLING THE SAME

(75) Inventor: Takashi Oshima, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 11/097,337

(22) Filed: Apr. 4, 2005

(65) Prior Publication Data

US 2006/0064537 A1 Mar. 23, 2006

(30) Foreign Application Priority Data

Sep. 21, 2004 (JP) ............................. 2004-273895

(51) Int. Cl.
*G06F 12/06* (2006.01)
(52) U.S. Cl. ...................... 711/115; 711/103; 711/170; 711/171; 711/172; 711/173; 365/230.01
(58) Field of Classification Search ............ 365/230.03, 365/233; 711/103, 115, 167
See application file for complete search history.

(56) References Cited

U.S. PATENT DOCUMENTS

| 5,799,168 | A | * | 8/1998 | Ban | 711/103 |
| 6,480,947 | B1 | * | 11/2002 | Hasegawa et al. | 711/167 |
| 6,650,593 | B2 | * | 11/2003 | Takemae | 365/233 |
| 6,823,417 | B2 | | 11/2004 | Spencer | |
| 6,931,582 | B2 | | 8/2005 | Tamura et al. | |
| 2003/0225962 | A1 | | 12/2003 | Hirosawa | |
| 2006/0064537 | A1 | | 3/2006 | Oshima | |

FOREIGN PATENT DOCUMENTS

| JP | 2002-259322 | 9/2002 |
| TW | 571243 | 1/2004 |

OTHER PUBLICATIONS

U.S. Appl. No. 11/690,367, filed Mar. 23, 2007, Oshima et al.
U.S. Appl. No. 258325US2S, filed Sep. 3, 2004, inventor Hiroshi Sukegawa.

* cited by examiner

*Primary Examiner*—Alan M. Otto
(74) *Attorney, Agent, or Firm*—Oblon, Spivak, McClelland, Maier & Neustadt, P.C.

(57) ABSTRACT

A controller comprises a host interface section and a processing circuit. The host interface section receives a command sequence outputted from a host apparatus to a first nonvolatile semiconductor memory. The processing circuit processes the command sequence outputted from the host apparatus to the first nonvolatile semiconductor memory, and controls writing, reading and erase of data to a second nonvolatile semiconductor memory, according to the command sequence.

6 Claims, 10 Drawing Sheets

| Pin number | Signal | | |
|---|---|---|---|
| | Pin name | Type | Function |
| 1 | GND | (O) | GND / (Card Detect) |
| 2 | R/-B | O (OD) | Ready / Busy |
| 3 | -RE | I | Read Enable |
| 4 | -CE | I | Card Enable |
| 5 | CLE | I | Command Latch Enable |
| 6 | ALE | I | Address Latch Enable |
| 7 | -WE | I | Write Enable |
| 8 | -WP | I | Write Protect |
| 9 | GND | | GND |
| 10 | D0 | I/O | Data0 |
| 11 | D1 | I/O | Data1 |
| 12 | D2 | I/O | Data2 |
| 13 | D3 | I/O | Data3 |
| 14 | D4 | I/O | Data4 |
| 15 | D5 | I/O | Data5 |
| 16 | D6 | I/O | Data6 |
| 17 | D7 | I/O | Data7 |
| 18 | Vcc | S | Vcc |

FIG. 3

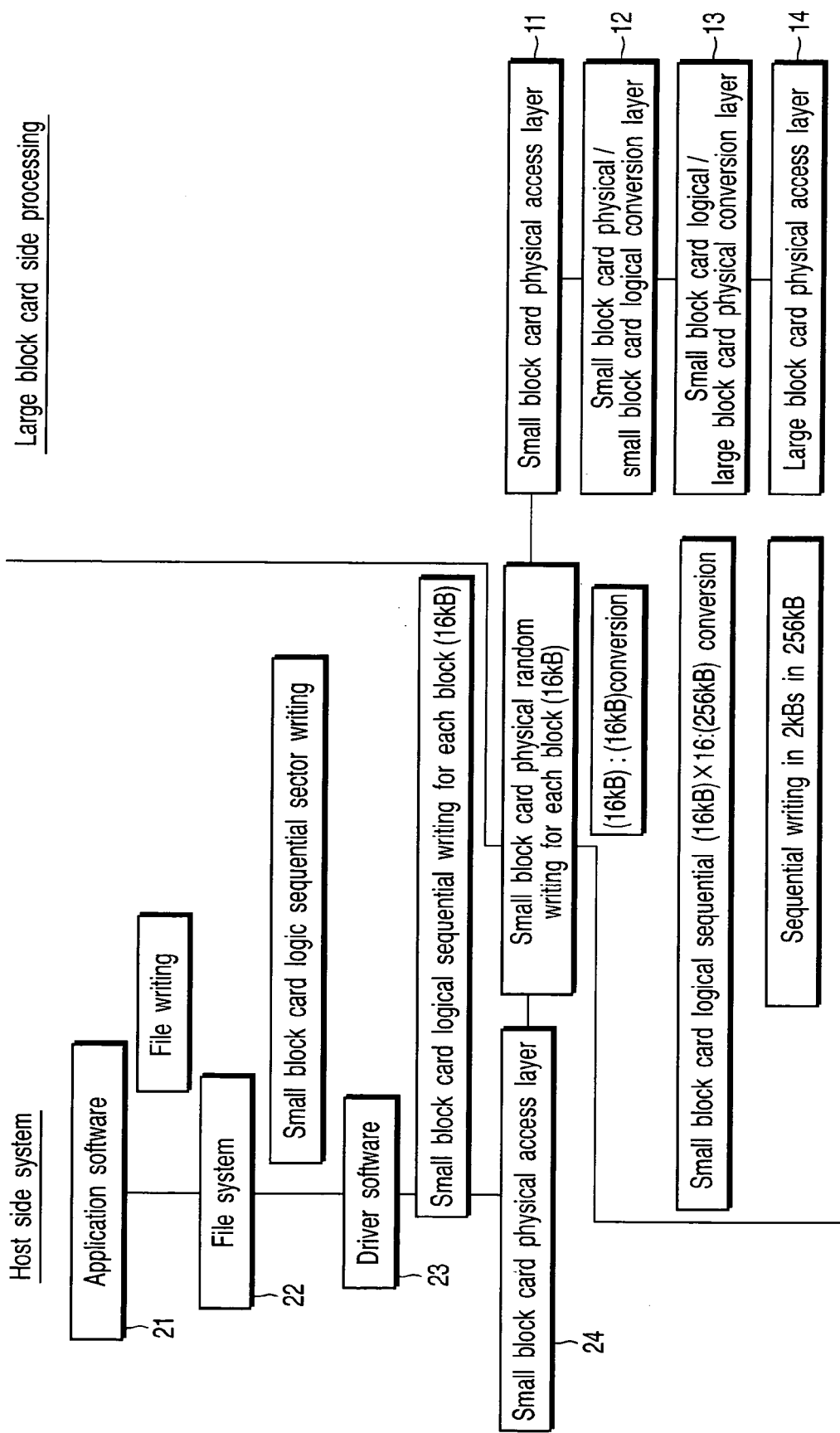
F I G. 8

MEMORY CARD HAVING A STORAGE CELL AND METHOD OF CONTROLLING THE SAME

CROSS-REFERENCE TO RELATED APPLICATIONS

This application is based upon and claims the benefit of priority from prior Japanese Patent Application No. 2004-273895, filed Sep. 21, 2004, the entire contents of which are incorporated herein by reference.

BACKGROUND OF THE INVENTION

1. Field of the Invention

This invention relates to a memory card having a controller and storage cells, and a method of controlling the memory card. For example, it relates to a memory card which performs writing, reading and erase of data by access from a host apparatus, a controller mounted on the memory card, and a method of controlling the memory card.

2. Description of the Related Art

Recently, in various portable electronic apparatuses such as personal computers, PDAs, cameras, and mobile phones, memory cards which are one kind of removable memory devices are widely used. Among memory cards, there are cards which do not have a controller but only have a NAND type flash memory. The conventional NAND type flash memory generally has a small erase block size in erase set to, for example, 16 kbytes.

In the meantime, as NAND type flash memory mounted on memory cards, inexpensive NAND type flash memories having a large capacity and a large erase block size in erase have been used. In the NAND type flash memories, the erase block size is set to, for example, 256 kbytes. Therefore, if the host apparatus accesses the memory card on the assumption that the memory is a NAND type flash memory having a small erase block size, the memory card having a NAND type flash memory having a large erase block size cannot properly respond to the access, and this causes a malfunction. The term "erase block size" indicates a data size which is erased at once in erase in a NAND type flash memory.

Jpn. Pat. Appln. KOKAI Pub. No. 2002-259322 discloses a memory system having a plurality of kinds of memory chips and a memory controller that controls the memory chips, wherein one memory controller enables access to the plurality of kinds of memory chips.

BRIEF SUMMARY OF THE INVENTION

A controller according to an aspect of the present invention comprises: a host interface section which receives a command sequence outputted from a host apparatus to a first nonvolatile semiconductor memory; and a processing circuit which processes the command sequence outputted from the host apparatus to the first nonvolatile semiconductor memory, and controls writing, reading and erase of data to a second nonvolatile semiconductor memory, in response to the command sequence.

A method of controlling a memory card according to an aspect of the present invention is a method of controlling a memory card mounted on a host apparatus and accessed by the host apparatus, comprising: determining whether a command input from the host apparatus is writing, reading, erase, ID read, or status read; determining whether an address of predetermined bytes has been input, if the command is any one of writing, reading, and erase; performing the one of writing, reading and erase, if the address of the predetermined bytes is input; determining whether a command has been input from the host apparatus, if the address of the predetermined bytes is not input; and performing one of ID read and status read, if the command is the one of the ID read and status read.

BRIEF DESCRIPTION OF THE SEVERAL VIEWS OF THE DRAWING

FIG. 3 is a table showing pin assignments of the memory card of the embodiment;

FIG. 8 is a diagram illustrating communication hierarchies in a host-apparatus-side system and in the memory card;

DETAILED DESCRIPTION OF THE INVENTION

Figure 1:
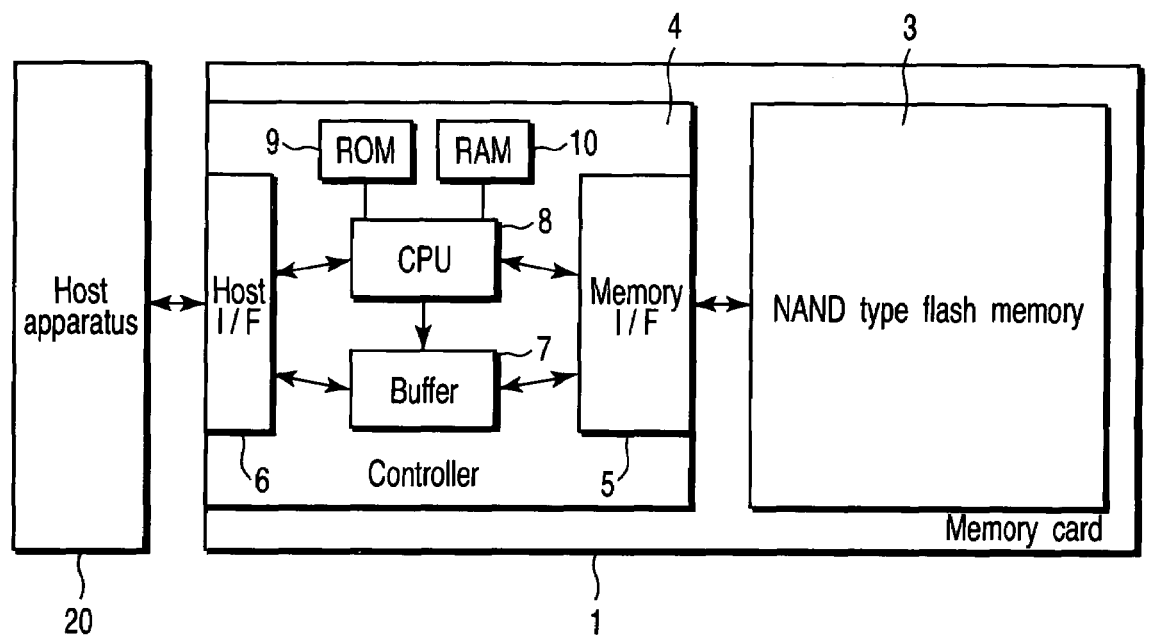
FIG. 1 is a block diagram illustrating a structure of a memory card according to an embodiment of the present invention.

An embodiment of the present invention will now be described with reference to drawings. In explanation, like reference numerals denote like constituent elements through all the drawings.

FIG. 1 is a block diagram illustrating a structure of a memory card according to the embodiment of the present invention.

As shown in FIG. 1, a memory card 1 comprises a NAND type flash memory 3 and a controller 4. The controller 4 includes function blocks such as a CPU (Central Processing Unit) and a ROM (Read-Only Memory) 9. Each of the devices will be detailed below. The NAND type flash memory 3 may be a binary memory that stores information of 1 bit in one memory cell, or may be a multilevel memory that stores information of more than 1 bit (2 bits, for example) in one memory cell. Although an example of using a NAND type flash memory is explained in the embodiment, the present invention is not limited to it, but is also applicable to other nonvolatile semiconductor memories, such as a NOR type memory.

Further, although not shown, the NAND type flash memory 3 and the controller 4 may be arranged on a PCB (Printed Circuit Board) substrate, or may be formed in the same LSI (Large-Scale Integration).

The terms "logical block address" and "physical block address" used in the following explanation indicate a logical address and a physical address, respectively, of a block itself. Further, although the terms "logical address" and "physical address" mainly indicate a logical address and a physical address, respectively, of the block address, they may also indicate addresses corresponding to a resolution unit smaller than the block unit.

The host apparatus 20 has hardware and software (system) for performing access to the memory card 1 to be connected. The host apparatus 20 is configured to manage a physical state (which physical block address includes logical sector address data and which ordinal number the logical sector address data has, or which block is in an erased state) inside the memory card, and directly control the NAND type flash memory 3 in the memory card 1.

Further, the host apparatus 20 performs assignments of logical addresses and physical addresses in 16 kbytes, on the assumption of using a NAND type flash memory having an erase block size in erase fixed to 16 kbytes. In many cases, the host apparatus 20 performs a sequential write access or a sequential read access for 16 kbytes of logical addresses (issues a corresponding command).

The memory card 1 operates in response to power supply when it is connected to the host apparatus 20, and performs processing in accordance with access from the host apparatus 20. The memory card 1 has the NAND type flash memory 3 and the controller 4 as described above.

The NAND type flash memory 3 is a non-volatile memory having an erase block size in erase (erase unit block size) fixed to 256 kbytes, and performs write and read of data in 16 kbytes, for example. The NAND type flash memory 3 is manufactured by using, for example, a 0.09 mm process technique. Specifically, the design rule of the NAND type flash memory is less than 0.1 µm.

The controller 4 has a memory interface section 5, a host interface section 6, a buffer 7, and a RAM (Random Access Memory) 10, in addition to the CPU 8 and the ROM 9 described above.

The memory interface section 5 performs interface processing between the controller 4 and the NAND type flash memory 3. The host interface section 6 performs interface processing between the controller 4 and the host apparatus 20.

Figure 2:
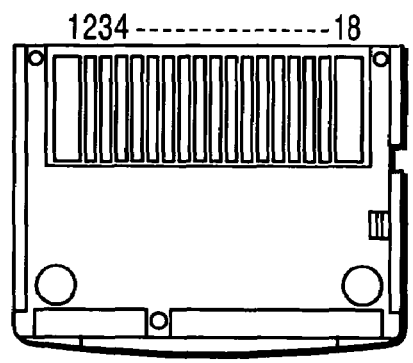
FIG. 2 is a plan view according to an outside shape and pin configuration of the memory card of the embodiment.

FIG. 2 is a plan view illustrating pin configuration of the memory card of the embodiment, viewed from the pin forming surface thereof. Pins of the host interface section 6 are arranged as shown in FIG. 2. FIG. 3 shows pin assignments of the pins, that is, pin numbers and signals assigned to the pins. Pins 1 and 9 are assigned to a reference voltage such as a ground voltage GND, and pin 18 is assigned to a power supply voltage Vcc. Pin 2 is assigned to a ready/busy signal R/-B (Ready/Busy) for notifying the host apparatus 20 of the internal operation state of the memory card 1. When an operation is being performed inside the memory card 1, such as writing, reading and erase, the pin 2 outputs a busy signal, and outputs a ready signal when the operation is completed. Pin 3 is assigned to a read enable signal -RE (Read Enable), pin 4 is assigned to a card enable signal -CE (Card Enable) that sets the memory card 1 to an operation mode. Pin 5 is assigned to a command latch enable signal CLE (Command Latch Enable) for controlling latch of commands, and pin 6 is assigned to an address latch enable signal ALE (Address Latch Enable) for controlling latch of addresses and input data. Pin 7 is assigned to a write enable signal -WE (Write Enable) for writing data in the memory card 1, and pin 8 is assigned to a write protect signal -WP (Write Protect) for forcing write protect and erase protect. Further, pins 10, 11, . . . , 17 are assigned to pins D0 (Data 0), D1 (Data 1), . . . , D7 (Data 7), respectively, to/from which commands, addresses and data are input/output. As described above, the memory card 1 of the embodiment has the pin configuration corresponding to the pin configuration of the NAND type flash memory, such that the host apparatus 20 can access the memory card 1 by a command sequence to the NAND type flash memory. The term "command sequence" means a sequence (input timing) in which a command and an address are input. In FIG. 3, the symbol "S" represents a power supply voltage, "I" means an input to the memory card, "O" represents an output from the memory card, and "I/O" represents an input and output to the memory card. Further, the symbol "-" attached to the head of a pin number (signal name) indicates that the signal is a Low True signal, that is, a signal carrying an instruction of activation in the case of "L".

The buffer 7 temporarily stores data of a predetermined amount (for 1 page, for example) when data transmitted from the host apparatus 20 is written in the NAND type flash memory 3, and when data read from the NAND type flash memory 3 is sent to the host apparatus 20.

The CPU 8 controls the operation of the whole memory card 1. The ROM 9 is a memory that stores a control program used by the CPU 8, and the like. The RAM 10 is a volatile memory that is used as work area of the CPU 8, and stores a control program and various tables. For example, when the memory card 1 receives power supply, the CPU 8 loads firmware (control program) stored in the ROM 9 into the RAM 10 and performs a predetermined processing. Thereby, the CPU 8 prepares various tables in the RAM 10, performs access to a relevant region in the NAND type flash memory 3 in response to a write command, a read command, or an erase command from the host apparatus 20, and controls data transmission through the buffer 7.

Figure 4:
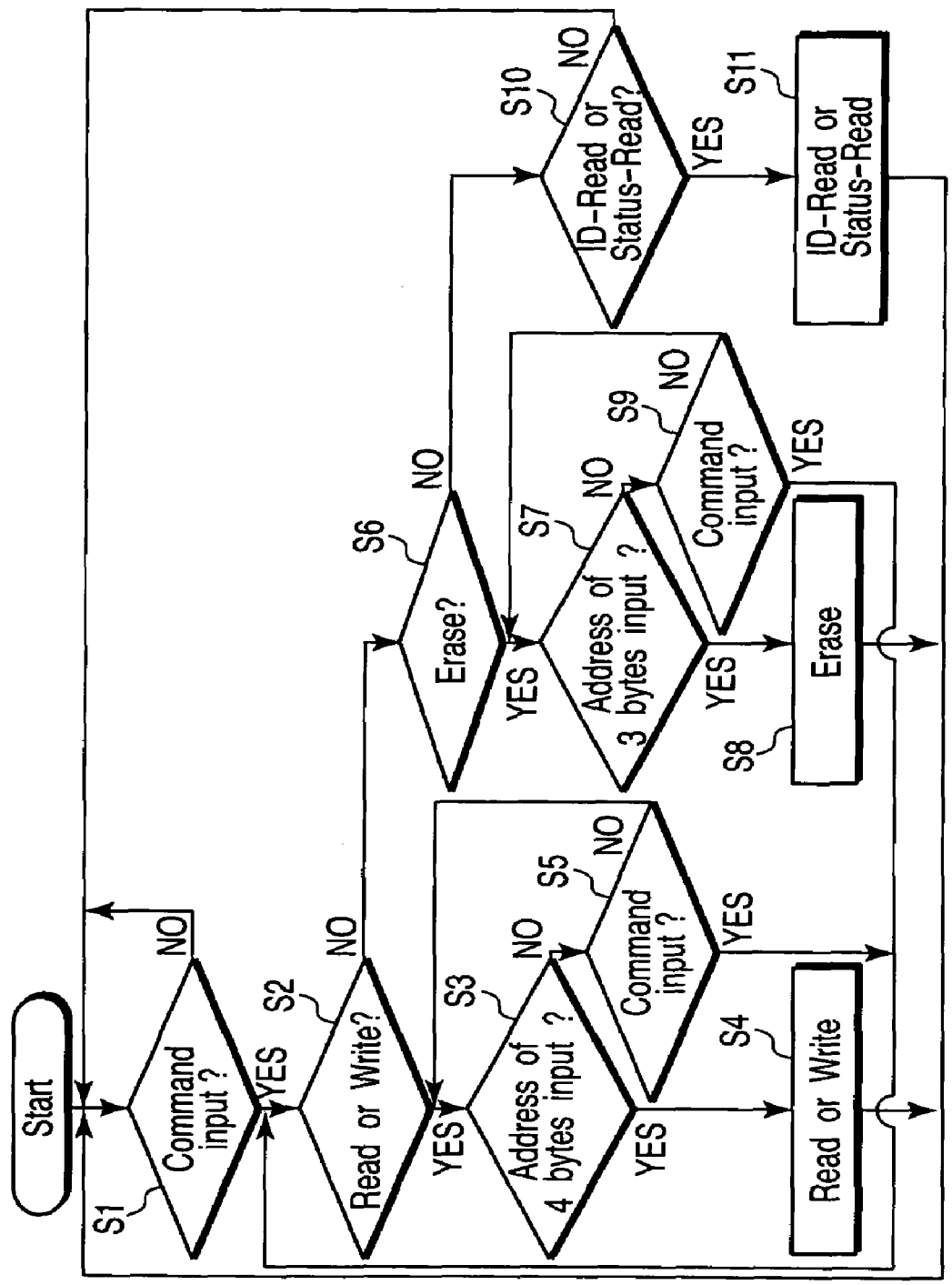
FIG. 4 is a flow chart illustrating an example of a control procedure for processing a command sequence input to the memory card of the embodiment.

FIG. 4 is a flow chart illustrating an example of control performed by the firmware (control program), and a control procedure for processing a command sequence input from the host apparatus 20.

First, the CPU 8 determines whether a command has been input from the host apparatus 20 (step S1). Thereafter, when a command is input, the CPU 8 determines whether the command is a write command or a read command (step S2). When the CPU 8 determines in step S1 that a command is not input, it returns to step S1 again.

Next, when the CPU 8 determines that the input command is a write command or a read command, it determines whether an address of predetermined bytes, 4 bytes in this example, has been input (step S3). When an address of 4 bytes is input, the CPU performs writing or reading (step S4), and returns to step S1. In the meantime, in step S3, when an address of 4 bytes is not input within a predetermined time, the CPU determines again whether a command has been input (step S5). When the CPU 8 determines that a command has been input in step S5, it returns to step S2 and repeats the processing of step S2 and later steps. In the meantime, when a command is not input, the CPU returns to step S3 and repeats the processing of step S3 and later steps.

Further, in step S2, when the CPU 8 determines that the input command is not a write command or a read command, the CPU 8 determines whether the command is an erase command or not (step S6). When the CPU determines that the input command is an erase command, the CPU determines whether an address of predetermined bytes, 3 bytes in this example, has been input (step S7). When the CPU 8 determines in step S7 that an address of 3 bytes is input, the CPU 8 performs erase (step S8), and returns to step S1. In the meantime, in step S7, if a 3 bytes of address is not input within a predetermined time, the CPU 8 determines again whether a command has been input or not (step S9). If a command is input, the CPU 8 returns to step S2, and repeats the processing of step S2 and later steps. In the meantime, if a command is not input, the CPU 8 returns to step S7, and repeats the processing of step S7 and later steps.

Further, in step S6, when the CPU 8 determines that the input command is not an erase command, the CPU 8 determines whether the command is an ID read command or a status read command (step S10). When the CPU 8 determines that the input command is an ID read command or a status read command, the CPU 8 performs ID read or status read (step S11), and returns to step S1. In the meantime, if the CPU 8 determines that the input command is not an ID read command or a status read command, the CPU 8 does not perform any processing, and only returns to step S1.

Figure 5:
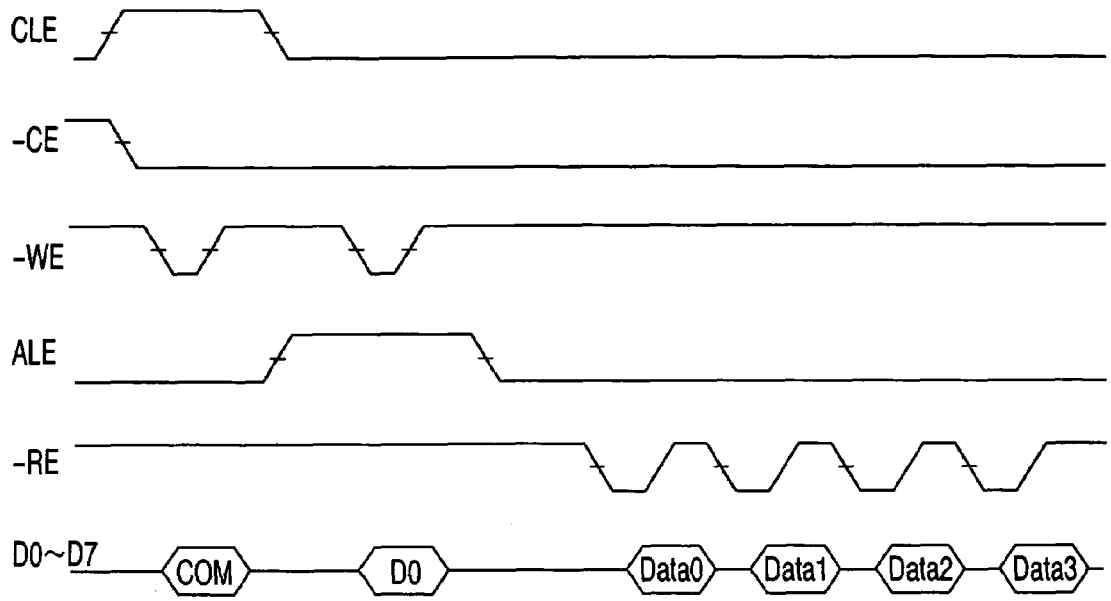
FIG. 5 is a timing chart illustrating an example of a command sequence of an ID read command input to the memory card of the embodiment.
Figure 6:
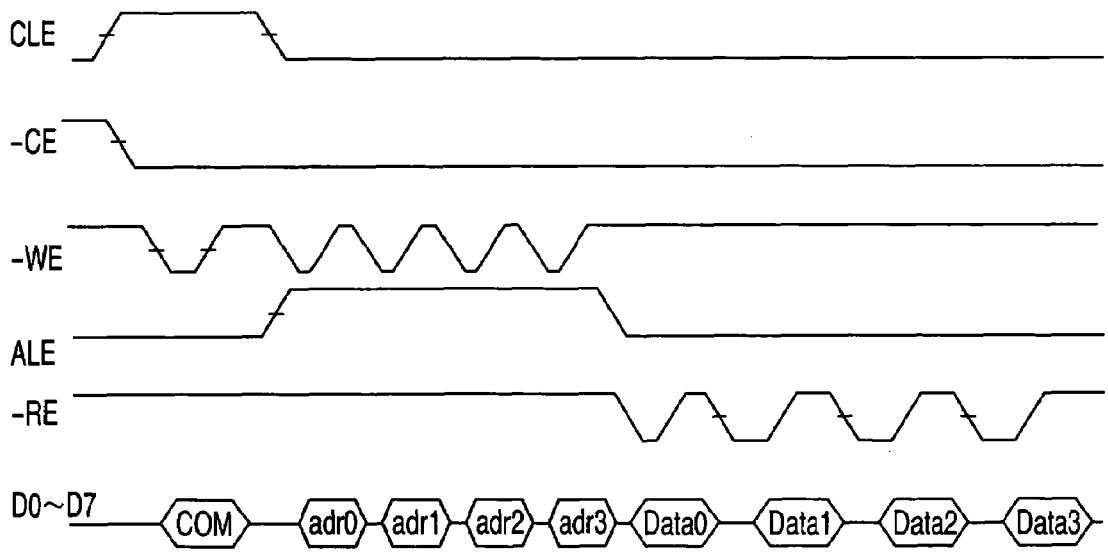
FIG. 6 is a timing chart illustrating another example of the command sequence of the ID read command input to the memory card of the embodiment.

FIGS. 5 and 6 are timing charts of command sequences, each including an ID read command, input from the host apparatus 20 to the controller 4. When the command sequence shown in FIG. 5 is a command sequence of an ID read command defined in the specifications of the memory card 1, suppose that there is a host apparatus that is aimed at performing ID reading by the command sequence shown in FIG. 6.

In the command sequence shown in FIG. 5, a command, an address and data are input/output at the following timing.

When the command latch enable signal CLE is "high level (hereinafter referred to as "H")", the card enable signal -CE is "low level (hereinafter referred to as "L")" and the address latch enable signal ALE is "L", an ID read command COM is latched from the pins D0 to D7 to the controller 4 at a rising edge of the write enable signal -WE. Next, when the command latch enable signal CLE is "L", the card enable signal -CE is "L" and the address latch enable signal ALE is "H", an address "00 (hexadecimal number)" is latched from the pins D0 to D7 to the controller 4, at a rising edge of the write enable signal -WE. Further, when the command latch enable signal CLE is "L", the card enable signal -CE is "L", and the address latch enable signal ALE is "L", data 0 to data 3 are latched from the pins D0 to D7 to the host apparatus 20 at a rising edge of the read enable signal -RE.

Further, in the command sequence shown in FIG. 6, a command, addresses and data are input/output at the following timing.

When the command latch enable signal CLE is "H", the card enable signal -CE is "L", and the address latch enable signal ALE is "L", the ID read command COM I is latched from the pins D0 to D7 to the controller 4 at a rising edge of the command enable signal -WE. Next, when the command latch enable signal CLE is "L", the card enable signal -CE is "L", and the address latch enable signal ALE is "H", addresses adr1 to adr3 are latched from the pins D0 to D7 to the controller 4, at a rising edge of the write enable signal -WE. Further, when the command latch enable signal CLE is "L", the card enable signal -CE is "L", and the address latch enable signal ALE is "L", data 0 to data 3 are latched from the pins D0 to D7 to the host apparatus 20, at a rising edge of the read enable signal -RE.

In the command sequence of an ID read command shown in FIG. 6, inputs of addresses adr1 to adr3 should be ignored. However, in the conventional memory card not having a control program for performing the control procedure shown in FIG. 4, an address of 4 cycles is issued from the host apparatus 20 as in the case of writing and reading. Therefore, the sequencer in the controller may interpret the input of the addresses adr1 to adr3, which should be ignored, as address input in writing and reading and malfunction.

Therefore, the memory card 1 of the embodiment processes the command sequence shown in FIG. 6 by using the control procedure shown in FIG. 4. Thereby, the process is performed in the order of S1, S2, S6, S10 and S11, and ID reading is performed. Specifically, even when the addresses adr1 to adr3 are input, malfunction does not occur by misinterpreting them as input for writing and reading, and ID reading is properly performed.

In this embodiment, although 4 cycles of addresses are input after input of an ID read command, the present invention is not limited to it. Also in other cases where a command sequence according to the specifications is not input from the host apparatus 20, the memory card of the present invention can perform proper processing without malfunction. Further, although the embodiment discloses an example in which the control procedure shown in FIG. 4 is performed by firmware (control program), it may be performed by hardware (sequencer) formed in the controller 4.

Figure 7:
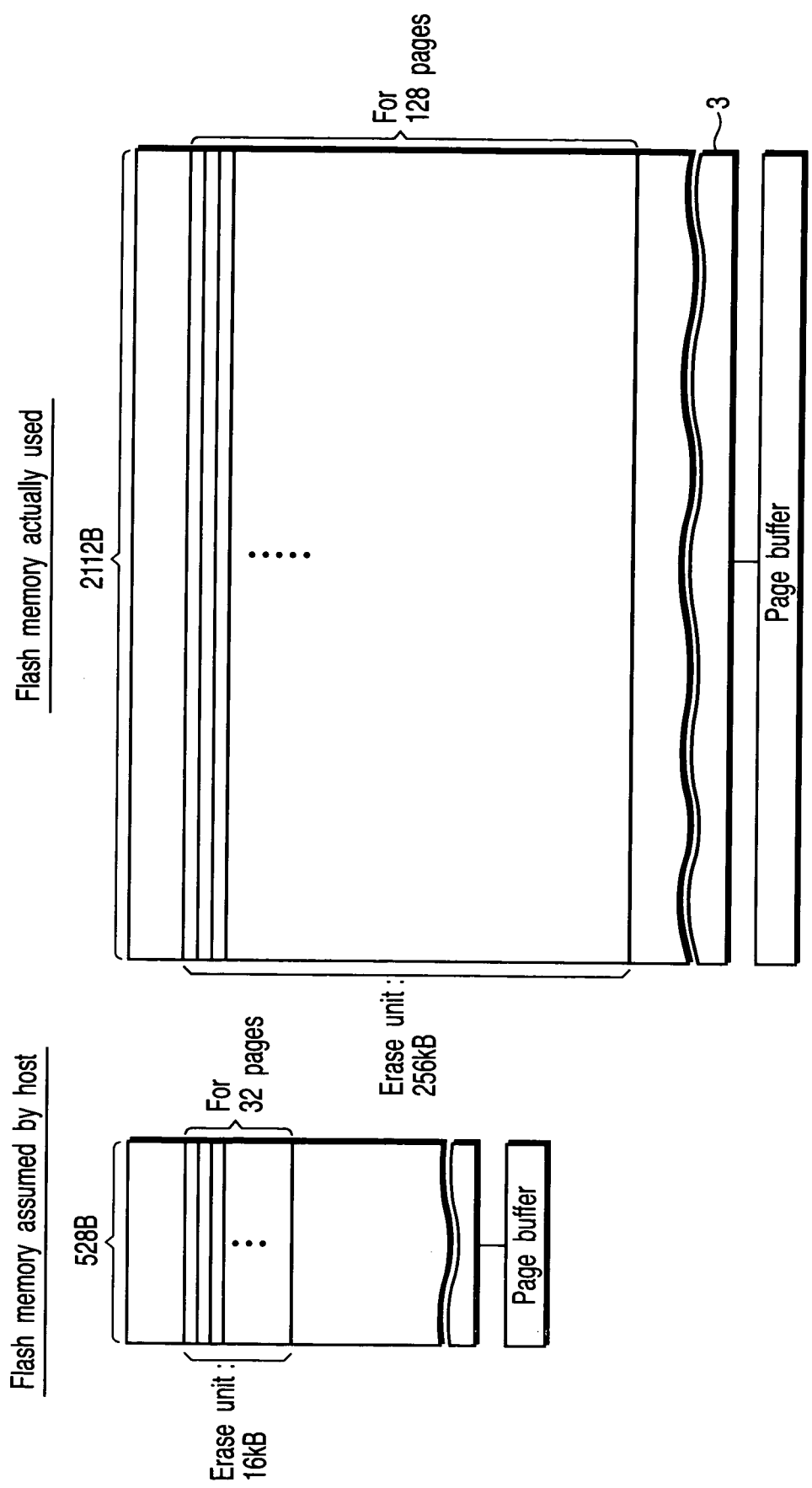
FIG. 7 is a diagram illustrating data arrangements of a flash memory assumed by a host apparatus and a NAND type flash memory in the memory card.

FIG. 7 illustrates difference in data arrangement between a flash memory assumed by the host apparatus 20 and the flash memory that is actually used (the NAND type flash memory 3 in the memory card 1).

In the flash memory assumed by the host apparatus 20, each page has 528 bytes (a data storing portion of 512 bytes+a redundant portion of 16 bytes), and 32 pages constitute an erase unit (that is, 16 kbytes+0.5 kbytes (k is 1024)). A card having such a flash memory is sometimes referred to as "small block card" below.

In the meantime, in the flash memory 3 that is actually used, each page has 2112 bytes (for example, a data storing portion of 512 bytes×4+a redundancy portion of 10 bytes× 4+a management data storing portion of 24 bytes), and 128 pages constitute an erase unit (specifically, 256 kbytes+8 kbytes). A card 1 having such a flash memory 3 is sometimes referred to as "large block card" below. In the following explanation, the erase unit of small block cards is referred to as "16 kbytes", and the erase unit of large block cards is referred to as "256 kbytes", for convenience' sake.

Each of the flash memory assumed by the host apparatus 20 and the flash memory 3 that is actually used has a page buffer for performing data input/output to the flash memory. A storage capacity of the page buffer provided to the flash memory assumed by the host apparatus 20 is 528 bytes (512 bytes+16 bytes). In the meantime, a storage capacity of the page buffer provided to the flash memory that is actually used is 2112 bytes (2048 bytes+64 bytes). In data writing and the like, each of the page buffers executes data input/output to the flash memory in the unit for 1 page that corresponds to its storage capacity.

The example shown in FIG. 7 is the case where the erase block size of the flash memory 3 that is actually used is 16 times as large as the erase block size of the flash memory assumed by the host apparatus 20, the present invention is not limited to it, but may be configured to have another ratio as long as the erase block size of the flash memory 3 is an approximate integral multiple of that of the flash memory assumed by the host apparatus 20.

To make large block cards practically useful products, it is desirable that the flash memory 3 shown in FIG. 7 has a storage capacity of at least 1 gigabit. If the storage capacity of the flash memory 3 is, for example, 1 gigabit, the number of 256 kbyte blocks (erase unit) of the flash memory 3 is 512. Although FIG. 7 illustrates the case where the erase unit is a 256 kbyte block, it is practically effective to configure the flash memory to have the erase unit of 128 kbyte block. In such a case, the number of 128 kbyte blocks of the flash memory 3 is 1024.

Further, although the example shown in FIG. 7 is the case where the erase block size of the flash memory 3 that is actually used is larger than the erase block size of the flash memory assumed by the host apparatus 20, the present invention is not limited to it. It is also possible to configure the memory card such that the erase block size of the flash memory 3 that is actually used is smaller than the erase block size of the flash memory assumed by the host apparatus 20.

FIG. 8 is a diagram illustrating communication hierarchies in the system of the host apparatus 20 side and the memory card 1 (large block card).

The system of the host apparatus 20 side has application software 21, a file system 22, driver software 23, and a small block card physical access layer 24. In the meantime, the memory card 1 (large block card) has a small block card physical access layer 11, a small block card physical/small block card logical conversion layer 12, a small block card logical/large block card physical conversion layer 13, and a large block card physical access layer 14.

For example, when the application software 21 of the host apparatus 20 side makes a request of writing in a file to the file system 22, the file system 22 instructs the driver software 23 to perform sequential sector writing on the basis of the logical block address of the small block card. In response to the instruction, the driver software 23 performs logical/physical block conversion when performing sequential writing for each 16 kbyte blocks based on the logical block address of the small block card, and issues a random write command according to the physical block address of the small block card to the large block card through the small card physical access layer 24, to perform data transfer.

In write accesses, both in the small block card and the large block card, there is the precondition that information is transmitted and received in the order of (1) command, (2) page address (row address), (3) column address, (4) data, and (5) program verification command, on the protocol.

When the small block card physical access layer 11 on the large block card side receives a write command based on the physical block address of the small block card from the host apparatus 20, the layer 11 acquires the physical block address and data, and in addition a logical block address included in associated data associated with them.

The small block card physical/small block card logical conversion layer 12 has a first table for performing conversion, in data reading or the like, from a physical block address (corresponding to a 16 kbyte block) of the small block card into a logical block address (corresponding to a 16 kbyte block) of the small block card. When the small block card access layer 11 acquires a logical block address of the small block card in response to a write command, the conversion layer 12 reflects the logical address on the first table. The conversion layer 12 also reflects the physical block address on the first table.

The small block card logical/large block card physical conversion layer 13 has a second table for performing conversion, in data reading or the like, from logical block addresses (corresponding to 16 of sequential 16 kbyte blocks) of the small block card to a physical block address (corresponding to a 256 kbyte physical block) of the large block card. When the small block card physical access layer 11 acquires logical block addresses of the small block card in response to a write command, the conversion layer 12 reflects the logical block address on the second table.

The large block card physical access layer 14 determines data arrangement in the flash memory 3, based on the logical block address of the small block card which the small block card physical access layer 1 has acquired from the received write command, and sequentially write data of 16 kbytes in 2 kbytes (1 page) in a 256 kbyte physical block. Further, the large block card access layer 14 stores the acquired logical block address and physical block address of the small block card in a predetermined region in a management data region in the flash memory 3.

As described above, since the host apparatus 20 issues a command based on a physical block address of the small block card, the large block card side performs management such that it is clear which 256 kbyte physical block includes data corresponding to the physical block address of the small block card. Specifically, the large block card side manages the correlation between the logical and physical block addresses of the small block card for each 16 kbyte block, and performs management such that it is clear which 256 kbyte physical block in the large block card stores sequential data corresponding to logical block addresses of the small block card for a 256 kbyte block.

Figure 9A:
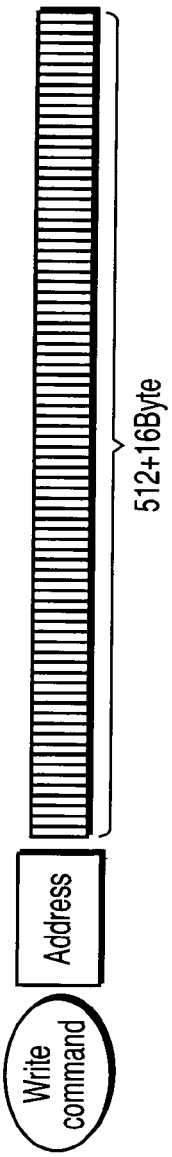
FIGS. 9A and 9B are diagrams each illustrating a format of a command transmitted from the host apparatus.
Figure 9B:
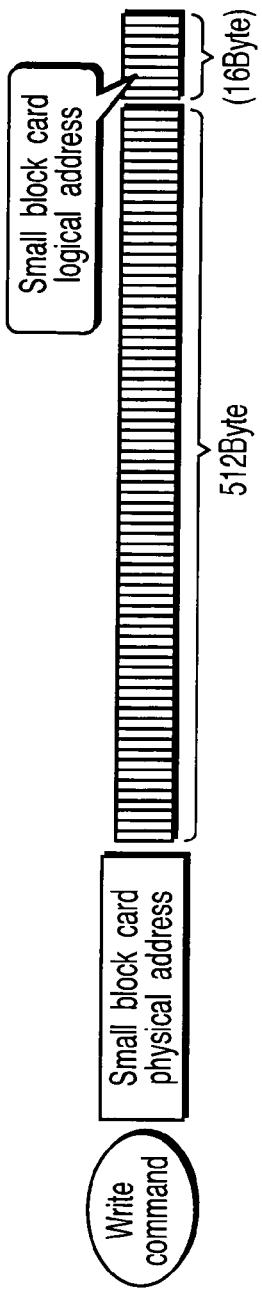

FIGS. 9A and 9B are diagrams each illustrating a format of a command transmitted from the host apparatus 20 side.

A packet of a command transmitted from the host apparatus 20 includes various information, such as command type information ("Write" in this example), an address (physical block address) and data (substantial data such as contents and associated data (512 bytes+16 bytes)), as shown in FIG. 9A.

In a packet having the above format, a "logical block address" (logical address corresponding to a 16 kbyte block to be accessed) of the small block card is arranged in a predetermined position of the associated data 16 bytes, as shown in FIG. 9B. The large block card acquires the command type information, the physical block address and data, and in particular the "logical block address". The "logical block address" is not added if the command is a read command.

Figure 10:
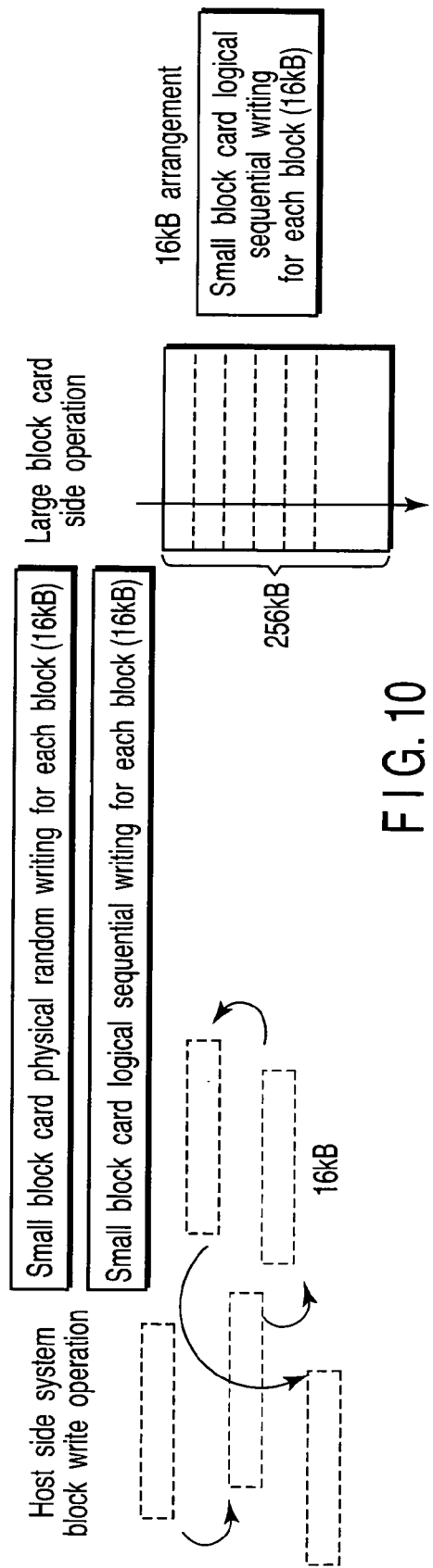
FIG. 10 is a diagram illustrating a block write operation assumed by the host apparatus in comparison with a write operation which is actually performed by the memory card.

FIG. 10 is a diagram illustrating a block write operation assumed by the host apparatus 20 side, in comparison with a write operation that is actually performed by the memory card 1 (large block card) side.

The host apparatus 20 side (the left side in FIG. 10) performs a random write operation in 16 kbyte blocks according to physical block addresses of the small block card, in occurrence of a sequential write operation in 16 kbyte blocks based on the logical addresses of the small block card.

In the meantime, when the large block card side (the right side in FIG. 10) receives a write command from the host apparatus 20 side, the large block card side sequentially writes data in 16 kbyte blocks based on the logical block address of the small block card in the flash memory 3.

As described above, the host apparatus 20 performs a random write operation in 16 byte blocks according to the physical addresses of the small block. In such random write operations, generally, processing for rewriting only a part of a large block (256 kbytes) occurs frequently. Since erase can be only performed in blocks in NAND type flash memories, if only a part of a block is to be rewritten, it is necessary to write new data for rewrite in an erased new block, and copy the other data which is not to be rewritten in the new block from the old block including the old data to be rewritten to the new data. As described above, processing to rewrite only a part of a block involves a copy operation of the data not to be rewritten (involved data copy). If processing to rewrite only a part of a block frequently occurs, overhead greatly increases. Therefore, in this embodiment, according to the order of the logical addresses obtained from the host apparatus 20 side, the physical addresses are assigned again on the large block card side. This reduces occurrence of writing for only a part of a block, and suppresses increase of overhead.

Figure 11:
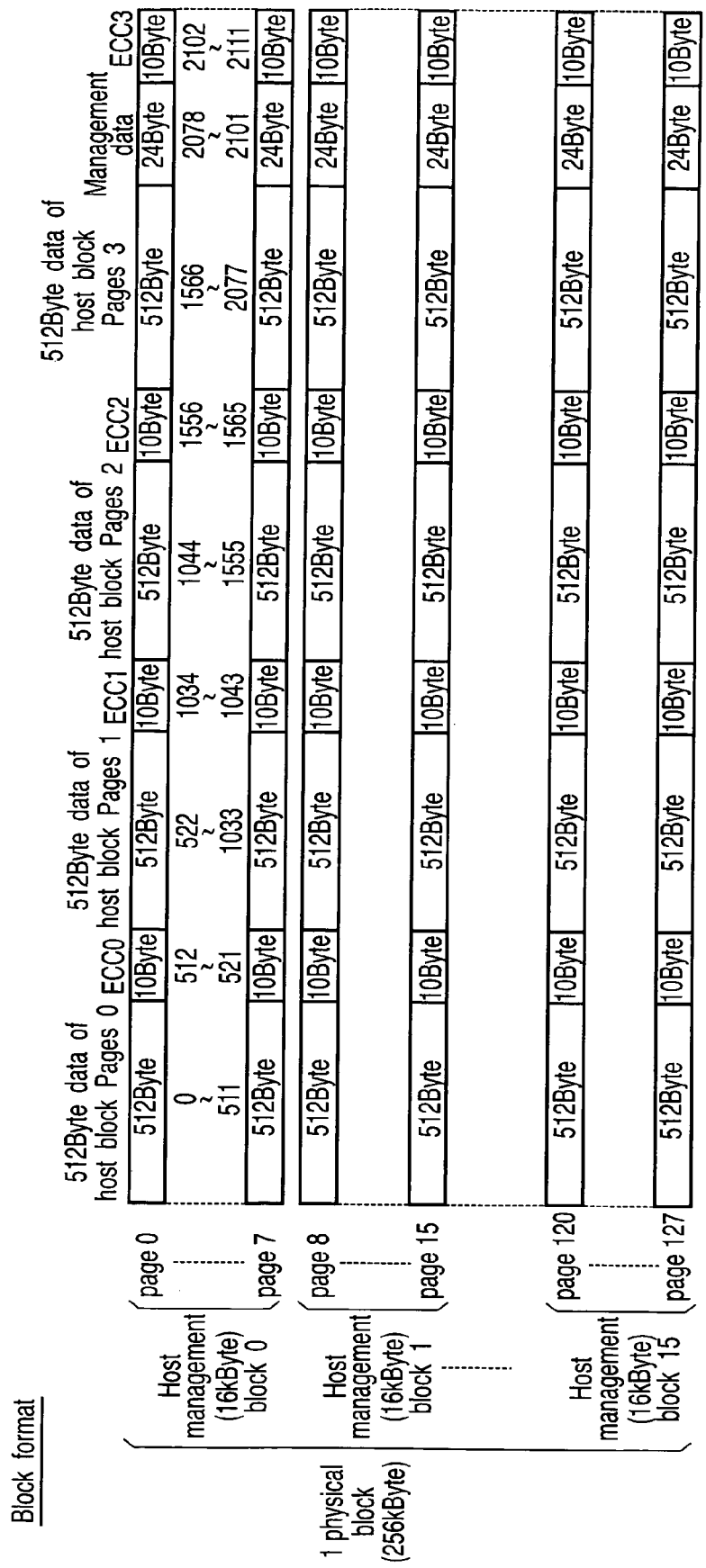
FIG. 11 is a diagram illustrating an example of a block format of the NAND type flash memory in the memory card.

FIG. 11 is a diagram illustrating an example of a block format (for a 256 kbyte physical block being an erase unit) of the NAND type flash memory 3 in the large block card.

In the large block card, each 256 kbyte physical block being the erase unit includes 16 blocks (hereinafter referred to as "host management block") for writing data corresponding to a 16 kbyte block being a unit by which the host apparatus 20 manages data. In data writing, individual data items are arranged in the order of logical block addresses in the small block card.

Each host management block is constituted by 8 pages. Each page includes 4 data regions each having 512 bytes, and 10 byte ECC regions corresponding to the respective data regions. Further, a 24 byte management data region is provided after the last 512 byte data region (the fourth 512 byte data region) in each page. Therefore, the last 10 byte ECC region in each page is configured to deal with both the fourth 12 byte data region and the 24 byte management data region.

Among 128 management data regions each having 24 byte and included in a 256 kbyte physical block being the erase unit, the last 24 byte management data region, for example, is configured to store an address information item corresponding to the physical block address acquired from a command transmitted from the host apparatus 20 side, and an address information item corresponding to the logical block address together. These address information items are used in preparation of the first table of the small block card physical/small block card logical conversion layer 12 and the second table of the small block card logical/large block card physical conversion layer 13, explained with reference to FIG. 8.

Figure 12:
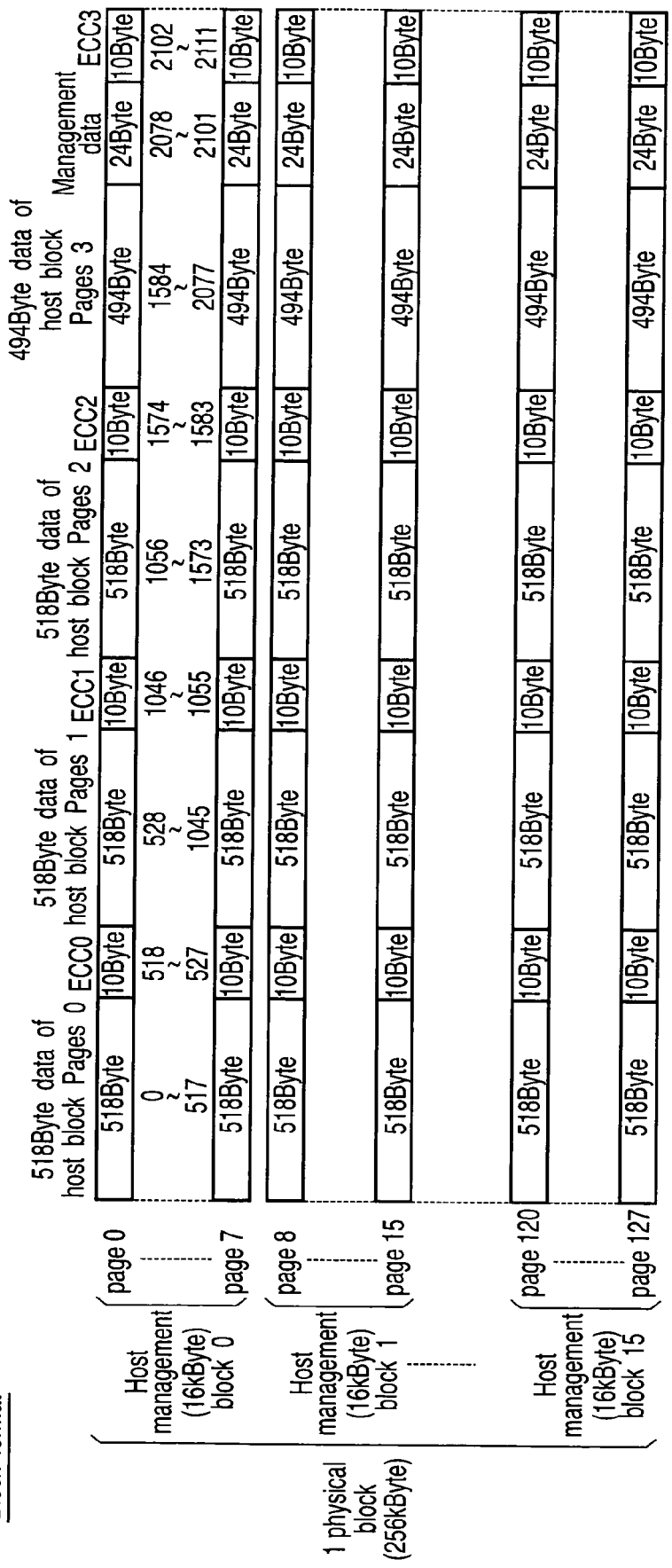
FIG. 12 is a diagram illustrating another example of the block format of the NAND type flash memory in the memory card.

FIG. 12 is a diagram illustrating another example of the block format of the NAND type flash memory 3 in the large block card.

The block format shown in FIG. 12 is different from the block format shown in FIG. 11 in the arrangement positions of ECC0, ECC1 and ECC2 in each page. However, the block format shown in FIG. 12 and the block format shown in FIG. 11 are the same in the storage capacity of user data in each page. Specifically, in the block format shown in FIG. 11, each page is provided with storage regions that amounts to 2048 bytes (512 bytes+512 bytes+512 bytes+512 bytes). In the block format shown in FIG. 12, each page is provided with storage regions that amount to 2048 bytes (518 bytes+518 bytes+518 bytes+494 bytes). The following explanation is made on the premise that the block format shown in FIG. 12 is adopted.

Figure 13:
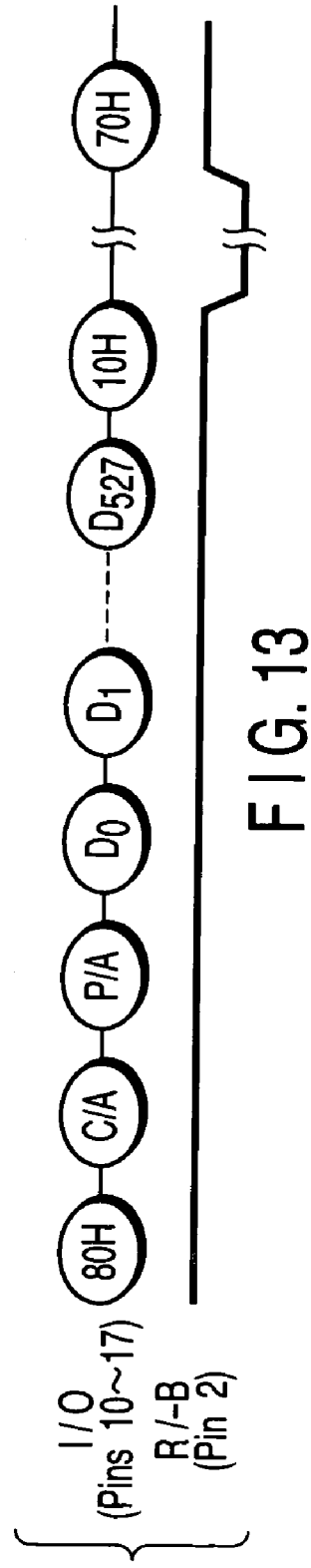
FIG. 13 is a timing chart illustrating an example of a signal input to and output from an I/O pin and an R/-B pin of the memory card when the host apparatus performs writing in the memory card of the embodiment.

FIG. 13 is a timing chart illustrating an example of a signal which is input in or output from the I/O (Input/Output) pins (pins 10-17) and the R/-B (Ready/Busy) pin (pin 2) of the memory card 1, when the host apparatus 20 performs writing data in the memory card 1 of the embodiment.

The host apparatus 20 controls the memory card on the assumption that the memory card 1 is a nonvolatile memory having an erase block size of 16 kbytes. For example, when performing writing of data in the memory card 1, the host apparatus 20 inputs a serial data input command "80H (H denotes a hexadecimal system)" to the I/O pins (pin 10 to pin 17). Next, the host apparatus 20 input a column address "C/A" and a page address "P/A" to the I/O pins. The column address "C/A" and the page address "P/A" are a column address and a page address, respectively, in a virtual physical address space which the host apparatus 20 assumes that the memory card 1 has.

Further, the host apparatus 20 inputs write data 528 times to each of the I/O pins (pin 10 to pin 17). Specifically, the host apparatus 20 successively inputs (shift-in) data of 528 bits for each I/O pin (the total is 528 bytes for all the I/O pins), while clocking the input signal to the write enable pin 528 times. When the shift-in of the data is completed, the host apparatus 20 inputs a program command "10H" to the I/O pins. In response to the command, the memory card 1 outputs a signal "L" to the R/-B pin to indicate that the memory card 1 is in the busy state. Thereafter, the memory card 1 outputs a signal "H" to the R/-B pin after a predetermined period of time to indicate that the memory card has become the ready state.

However, the state of the R/-B pin in FIG. 13 only indicates the state of the memory card 1 with respect to the host apparatus 20. Specifically, in FIG. 13, the R/-B pin indicating the busy state (that is, it outputs "L") in response to the input of the program command "10H" does not always mean that a write operation to the NAND type flash memory 3 (that is, data transfer from the page buffer to the memory cell array) is actually being performed. Further, even when the R/-B pin returns to the ready state, the write operation to the NAND flash memory 3 inside is not always completed.

Figure 14:
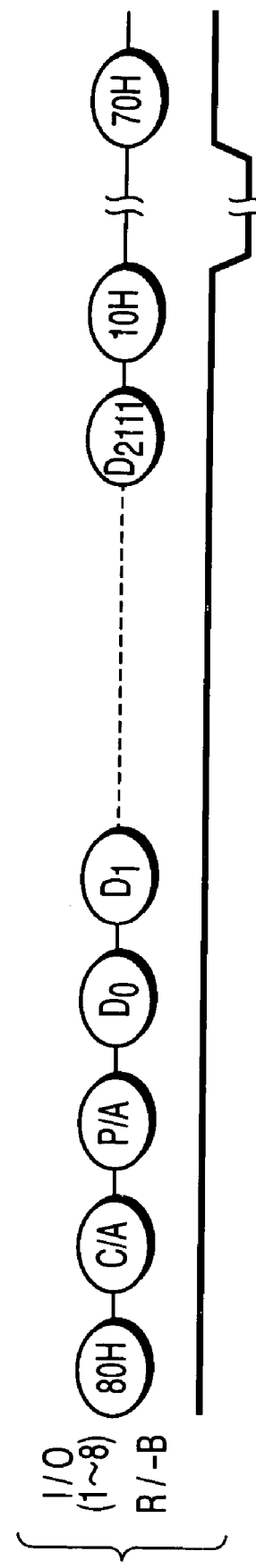
FIG. 14 is a timing chart illustrating an example of a signal input to and output from an I/O pin and an R/-B pin of the NAND type flash memory when the host apparatus performs writing in the NAND type flash memory in the memory card of the embodiment.

FIG. 14 is a timing chart illustrating an example of a signal which is input to or output from the I/O pins 1-8 and the R/-B (Ready/Busy) pin of the NAND type flash memory 3, when the controller 4 in the memory card 1 of the embodiment performs writing to the NAND type flash memory 3 in the memory card 1. Each of the NAND type flash memory 3 and the memory interface section 5 has I/O pins 1-8 to or from which commands, addresses and data are input/output, an R/-B (Ready/Busy) pin that outputs a ready/busy signal, and -RE (Read Enable) pin to which a read enable signal for outputting data is input, which are the same as the pins of the host interface section 6 shown in FIG. 3. Further, each of the flash memory 3 and the interface section 5 has a -CE (Card Enable) pin to which a card enable signal for setting the NAND type flash memory 3 to an operation mode is input, a CLE (Command Latch Enable) pin to which a command latch enable signal for controlling latch of a command is input, and an ALE (Address Latch Enable) pin to which an address latch enable signal for controlling latch of input data is input. Further, each of them has a -WE (Write Enable) pin to which a write enable signal for writing data in the NAND type flash memory 3 is input, and a -WP (Write Protect) pin to which a write protect signal for forcing write protect and erase protect is input.

The controller 4 recognizes the NAND type flash memory 3 as a nonvolatile memory having an erase block size of 256 kbytes. For example, in writing data in the NAND type flash memory 3, the controller 4 inputs a serial data input command "80H (H denotes hexadecimal number system)" to the I/O pins 1-8. Next, the controller 4 inputs a column address "C/A" and a page address "P/A" to the I/O pins 1-8. The column address "C/A" and the page address "P/A" are a column address and a page address, respectively, in a real physical address space which the controller 4 assumes that the NAND type flash memory 3 has. Therefore, they do not always correspond to the column address "C/A" and the page address "P/A" shown in FIG. 13.

Further, the controller 4 inputs write data 2112 times to each of the I/O pins 1-8. Specifically, the controller 4 successively inputs (shift-in) data of 2112 bits for each I/O pin (the total is 2112 bytes for all the I/O pins), while clocking the input signal to the write enable pin 2112 times. When the shift-in of the data is completed, the controller 4 inputs a program command "10H" to the I/O pins 1-8. In response to the command, the memory card 1 outputs a signal "L" to the R/-B pin to indicate that the memory card 1 is in the busy state. Thereafter, the memory card 1 outputs a signal "H" to the R/-B pin after a predetermined period of time to indicate that the memory card has become the ready state. The state of the R/-B pin in FIG. 14 indicates the actual state of the NAND flash memory 3 with respect to the controller 4.

In FIGS. 13 and 14, although one cycle is used for each input of the column address "C/A" and the page address "P/A", two or more cycles may be required according to the capacity of the memory card 1 or the capacity of the NAND type flash memory 3.

According to the memory card and the method of controlling the same of the embodiment of the present invention, it is possible to make a proper response to a host apparatus issuing commands having sequences which are neither defined nor prohibited in the specifications of the NAND type flash memory mounted on the memory card. Specifically, according to embodiments of the present invention, it is possible to provide a controller, a memory card and a method of controlling the same, which can properly respond to a host apparatus issuing commands with sequences which do not meet the specifications of the nonvolatile semiconductor memory mounted on the memory card.

The above embodiment is not the only embodiment of the present invention, but various embodiments can be made by changing the above structure or adding various constituent elements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory card configured to be coupled to a host apparatus and to receive a command sequence outputted from the host apparatus and intended for a first nonvolatile semiconductor memory, comprising:
    a second nonvolatile semiconductor memory having a different configuration than the first nonvolatile semiconductor memory; and
    a controller which processes the command sequence outputted from the host apparatus, and controls writing, reading and erasing of data to the second nonvolatile semiconductor memory, in response to the command sequence;
    wherein the controller processes the command sequence outputted from the host apparatus by the following control procedure comprising,
        determining whether a command included in the command sequence is a writing or reading command;
        determining whether an address of first predetermined bytes has been input, when the command is determined to be a writing or reading command;
        performing said writing or reading when the address of the first predetermined bytes has been input;
        determining whether the command is an erase command when the command is not a writing or reading command;
        determining whether an address of second predetermined bytes has been input when the command is an erase command;
        performing said erasing when the address of the second predetermined bytes has been input;
        determining whether the command is an ID read or a status read command when the command is not a writing, reading or erasing command; and
        performing said ID read or status read, when the command is an ID read or status read command.

2. The memory card according to claim 1, wherein the first nonvolatile semiconductor memory and the second nonvolatile semiconductor memory include a NAND type flash memory.

3. A memory card configured to be coupled to a host apparatus and to receive a command sequence outputted from the host apparatus and intended for a first nonvolatile semiconductor memory, comprising:
    a second nonvolatile semiconductor memory having a different configuration than the first nonvolatile semiconductor memory; and
    a controller which processes the command sequence outputted from the host apparatus, and controls writing, reading and erasing of data to the second nonvolatile semiconductor memory, in response to the command sequence;
    wherein the controller processes the command sequence outputted from the host apparatus by the following control procedure comprising,
        determining whether a command included in the command sequence is a writing or reading command;
        determining whether an address of first predetermined bytes has been input, when the command is a writing or reading command;
        performing said writing or reading, when the address of the first predetermined bytes has been input;
        determining whether a command has been input from the host apparatus, when the address of the first predetermined bytes has not been input;
        returning to the determining whether the command is a writing or reading command step, when the command has been input;
        returning to the determining whether the address of the first predetermined bytes has been input step, when the command has not been input;
        determining whether the command is an erase command when the command is not a writing or reading command;
        determining whether an address of second predetermined bytes has been input, when the command is determined to be an erase command;
        performing the erase when the address of the second predetermined bytes has been input;
        determining whether a command has been input from the host apparatus, when the address of the second predetermined bytes has not been input;
        returning to the determining whether the command is a writing or reading command step, when the command has been input;
        returning to the determining whether the address of the second predetermined bytes has been input step, when the command has not been input;

determining whether the command is an ID read or a status read command when the command is not a writing, reading or erasing command; and performing said ID read or status read, when the command is an ID read or status read command.

4. The memory card according to claim 3, wherein the first nonvolatile semiconductor memory and the second nonvolatile semiconductor memory include a NAND type flash memory.

5. A method of controlling a memory card coupled to a host apparatus and accessed by the host apparatus, comprising:

determining, using a controller included in the memory card, whether a command input from the host apparatus to the memory card is a writing or reading command;

determining, using a controller, whether an address of first predetermined bytes has been input from the host apparatus to the memory card, when the command is a writing or reading command;

performing, using a controller, said writing or reading to a nonvolatile semiconductor memory included in the memory card when the address of the first predetermined bytes has been input to the memory card;

determining, using a controller, whether the command is an erase command when the command determined by the controller is not a writing or reading command;

determining, using a controller, whether an address of second predetermined bytes has been input from the host apparatus to the memory card when the command is determined by the controller to be an erase command;

performing, using a controller, said erase command on the nonvolatile semiconductor memory when the address of the second predetermined bytes has been input to the memory card;

determining, using a controller, whether the command is an ID read or a status read command when the command is not a writing, reading, or erasing command; and performing, using a controller, said ID read or status read on the nonvolatile semiconductor memory, in dependence on whether the command determined by the controller is said ID read or status read command, respectively.

6. A method of controlling a memory card coupled to a host apparatus and accessed by the host apparatus, comprising:

determining, using a controller included in the memory card, whether a command input from the host apparatus to the memory card is a writing command or a reading command;

determining, using the controller, whether an address of first predetermined bytes has been input from the host apparatus to the memory card, when the command determined by the controller is a writing or reading command;

performing, using the controller, said writing or reading to a nonvolatile semiconductor memory included in the memory card, when the address of the first predetermined bytes has been input to the memory card;

determining, using the controller, whether a command has been input from the host apparatus to the memory card, when the address of the first predetermined bytes has not been input to the memory card;

returning, using the controller, to the determining whether the command is a writing or reading step, when the command has been input to the memory card;

returning, using the controller, to the determining whether the address of the first predetermined bytes has been input step, when the command has not been input to the memory card;

determining, using the controller, whether the command is an erase command when the command is not a writing or reading command;

determining, using the controller, whether an address of second predetermined bytes has been input from the host apparatus to the memory card, when the command is determined to be an erase command;

performing, using the controller, the erase to the nonvolatile semiconductor memory when the address of the second predetermined bytes has been input to the memory card;

determining, using the controller, whether a command has been input from the host apparatus to the memory card, when the address of the second predetermined bytes has not been input to the memory card;

returning, using the controller, to the determining whether the command is a writing or reading command step, when the command has been input to the memory card;

returning, using the controller, to the determining whether the address of the second predetermined bytes has been input step, when the command has not been input to the memory card;

determining, using the controller, whether the command is an ID read or a status read command when the command is not a writing, reading, or erasing command; and performing, using the controller, said ID read or status read, in dependence on whether the command is said ID read or status read command, respectively.

* * * * *